US012711137B2

(12) United States Patent
Zweig et al.

(10) Patent No.: US 12,711,137 B2
(45) Date of Patent: Aug. 18, 2026

(54) MANAGING ENGAGEMENT METHODS OF A DIGITAL ASSISTANT WHILE COMMUNICATING WITH A USER OF THE DIGITAL ASSISTANT

(71) Applicant: Intuition Robotics, Ltd, Ramat-Gan (IL)

(72) Inventors: Shay Zweig, Harel (IL); Yuval Baumel, Tel Aviv (IL); Dor Skuler, Oranit (IL); Eytan Weinstein, Tel Aviv (IL); Chen Sorias, Kibbutz Zikim (IL)

(73) Assignee: Intuition Robotics, Ltd., Ramat-Gan (IL)

( * ) Notice: Subject to any disclaimer, the term of this patent is extended or adjusted under 35 U.S.C. 154(b) by 432 days.

(21) Appl. No.: 18/158,023

(22) Filed: Jan. 23, 2023

(65) Prior Publication Data

US 2023/0237059 A1 Jul. 27, 2023

Related U.S. Application Data

(60) Provisional application No. 63/267,082, filed on Jan. 24, 2022.

(51) Int. Cl.
*G06F 16/2457* (2019.01)
*H04W 4/38* (2018.01)

(52) U.S. Cl.
CPC ........ *G06F 16/24575* (2019.01); *H04W 4/38* (2018.02)

(58) Field of Classification Search
CPC . G06F 3/167; G06F 16/24575; H04L 67/535; H04L 67/52; H04L 51/216; H04L 67/306; H04L 51/043; H04W 4/38
See application file for complete search history.

(56) References Cited

U.S. PATENT DOCUMENTS

| | | | | |
|---|---|---|---|---|
| 11,563,706 | B2 * | 1/2023 | Greenberg | H04L 51/226 |
| 11,588,913 | B1 * | 2/2023 | Castro | H04L 67/55 |
| 2006/0218029 | A1 * | 9/2006 | Chin | G06Q 50/188 705/80 |
| 2011/0298614 | A1 * | 12/2011 | Bells | G06Q 10/109 340/539.13 |
| 2014/0074483 | A1 * | 3/2014 | van Os | G10L 15/22 704/275 |

(Continued)

OTHER PUBLICATIONS

Otebolaku et al., "User context recognition using smartphone sensors and classification models", Mar. 19, 2016 (Year: 2016).*

*Primary Examiner* — Dung Hong
(74) *Attorney, Agent, or Firm* — M&B IP Analysts, LLC

(57) ABSTRACT

A method for interacting by a digital assistant with a user of the digital assistant, comprising: determining by the digital assistant an action to be executed by the digital assistant, wherein the action is determined based on at least a sensed current state of the user and a sensed current state of an environment near the user; selecting an engagement method from a plurality of engagement methods based on the current state of the user, the current state of an environment near the user, and the selected action; generating a customized plan for executing the selected action based on at least the selected engagement method; and executing the generated plan by employing an input/output (I/O) device on which the digital assistant is executing.

17 Claims, 3 Drawing Sheets

(56) References Cited

U.S. PATENT DOCUMENTS

| | | | | |
|---|---|---|---|---|
| 2014/0273978 | A1* | 9/2014 | Van Snellenberg | H04W 4/00<br>455/412.2 |
| 2014/0280578 | A1* | 9/2014 | Barat | H04W 4/12<br>709/204 |
| 2014/0368333 | A1* | 12/2014 | Touloumtzis | H04L 67/54<br>340/505 |
| 2016/0255466 | A1* | 9/2016 | Shuster | G06Q 10/1093<br>455/414.3 |
| 2017/0039476 | A1* | 2/2017 | Eyring | G06Q 10/1093 |
| 2017/0332347 | A1* | 11/2017 | Boss | H04W 24/08 |
| 2018/0188695 | A1* | 7/2018 | Kumar | G04G 13/02 |
| 2019/0230215 | A1* | 7/2019 | Zhu | H04M 1/724634 |
| 2020/0004583 | A1* | 1/2020 | Kelly | G06N 7/01 |
| 2021/0241203 | A1* | 8/2021 | Kwatra | G06N 20/00 |
| 2022/0366170 | A1* | 11/2022 | Wang | G06F 3/167 |
| 2022/0375315 | A1* | 11/2022 | Faaborg | G08B 1/08 |

* cited by examiner

MANAGING ENGAGEMENT METHODS OF A DIGITAL ASSISTANT WHILE COMMUNICATING WITH A USER OF THE DIGITAL ASSISTANT

CROSS-REFERENCE TO RELATED APPLICATIONS

This application claims benefit of U.S. provisional patent application Ser. No. 63/267,082, filed Jan. 24, 2022, which is herein incorporated by reference.

TECHNICAL FIELD

The disclosure generally relates to digital assistants operated in an I/O device, and more specifically for techniques for managing engagement methods of a digital assistant while communicating with a user of the digital assistant.

BACKGROUND

Digital assistants are designed to help users in planning their days, suggesting actions, and so on. However, user-agent (e.g., digital assistant) interaction may be irritating if the interaction is not properly managed.

Different communications that are initiated by a digital assistant do not necessarily have the same importance level, and the way the digital assistant communicates with a user in a first scenario does not necessarily suit a second scenario. Therefore, the user may encounter an unpleasant user experience when interacting with the digital assistant. For example, it may be desirable that the digital assistant will act differently when reminding the user about an important appointment that starts soon, as opposed to the way the digital assistant will remind the user to go over new unread emails.

As such, users may be frustrated from actions performed or suggested by the digital assistants, and eventually abandon the usage of such devices.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for interacting by a digital assistant with a user of the digital assistant, comprising: determining by the digital assistant an action to be executed by the digital assistant, wherein the action is determined based on at least a sensed current state of the user and a sensed current state of an environment near the user; selecting an engagement method from a plurality of engagement methods based on the current state of the user, the current state of an environment near the user, and the selected action; generating a customized plan for executing the selected action based on at least the selected engagement method; and executing the generated plan by employing an input/output (I/O) device on which the digital assistant is executing.

Certain embodiments disclosed herein include a system for interacting by a digital assistant with a user of the digital assistant the system, comprising: a processing circuitry; and a memory, the memory containing instructions that, when executed by the processing circuitry, configure the system to: determine an action to be executed by the digital assistant, wherein the action is determined based on at least a sensed current state of the user and a sensed current state of an environment near the user; select an engagement method from a plurality of engagement methods based on the current state of the user, the current state of an environment near the user, and the selected action; generate a customized plan for executing the selected action based on at least the selected engagement method; and execute the generated plan by employing an input/output (I/O) device on which the digital assistant is executing.

Certain embodiments disclosed herein include a method performed by an input/output (I/O) device having a digital assistant, at least one sensor, and at least one resource, the method comprising: determining by the digital assistant an action to be executed by the I/O device, wherein the action is determined based on at least a sensed current state of a user of the I/O device and a current state of an environment near the user, wherein the at least one sensor is used to sense information upon which is based at least one of the current state of the user and the current state of the environment near the user; select an engagement method from a plurality of engagement methods based on the current state of the user, the current state of an environment near the user, and the selected action; generate a customized plan for executing the selected action based on at least the selected engagement method; and executing the generated plan by at least operation of at least one of the at least one resource.

DETAILED DESCRIPTION

Figure 1:
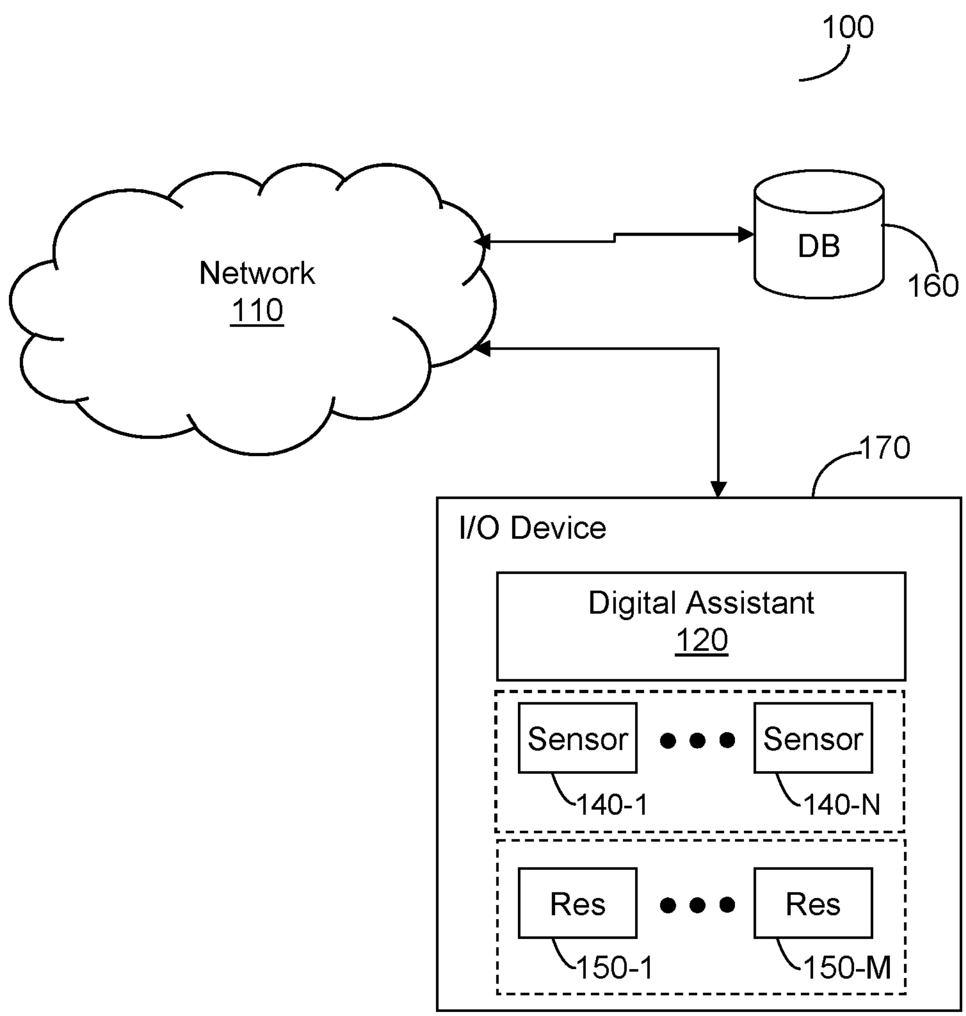
FIG. 1 is a network diagram utilized to describe the various disclosed embodiments.

The embodiments disclosed by the disclosure are only examples of the many possible advantageous uses and implementations of the innovative teachings presented herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

The embodiments disclosed herein provide specific advantages in the solution of digital assistant utilization problems. Digital assistants are designed to help users in planning their days, suggesting that the user perform a certain function, and so on. However, providing recommendations or suggestions to perform a function is not enough as the user may not perform such function due to the current state of the user, behavioral inclinations of the user, or the like. Thus, the digital assistant can execute, i.e., take or perform, one or more actions which may, but need not be, be intended to cause the user to perform a function, e.g., a function that the digital assistant thinks that the user should presently perform. Actions that may be executed by the digital assistant may include, for example, suggesting that the user be more active, reminding the user to timely take medications, notifying the user that a message has been received in one of her/his social media accounts, and so on. To better engage with the user, the disclosed embodiments provide digital assistants with the ability to select an engagement method for communicating with the user based on a current state of the user and a desired action to be executed by the digital assistant. An engagement method is a method for communicating with the user of the digital assistant having a predefined interruption intensity with respect to the user. That is, the engagement method reflects the required level of interruption to the user based on the type of the action to be taken and the current state. Thus, the action may be translated in accordance with a selected engagement method into a customized plan to implement the action by the digital assistant.

By selecting and employing an engagement method from a variety of available engagement methods, the efficacy and/or propriety of the I/O device with regard to the user is improved as unhelpful or unwanted interaction of the I/O device with the user may be avoided.

By way of example, the disclosed embodiments call for selecting an engagement method that is implemented by executing a customized plan to implement an action by the digital assistant for a user when it is determined that it is desirable to execute an action by the digital assistant. The engagement method may be selected based on a current state of the user of the digital assistant, the selected action, and historical data gathered with regard to the user. The current state may be determined by collecting sensory data from sensors connected to the digital assistant. The various disclosed embodiments will be discussed in greater detail below.

FIG. 1 is an example network diagram 100 utilized to describe the various disclosed embodiments. The network diagram 100 includes an input/output (I/O) device 170 hosting, or on which is executing, a digital assistant 120. In some embodiments, the digital assistant 120 is further connected to a network 110 to allow some of the processing for digital assistant 120 to be performed by a remote server, e.g., a cloud server. The network 110 may provide for communication between the elements shown in the network diagram 100. The network 110 may be, but is not limited to, a local area network (LAN), a wide area network (WAN), a metro area network (MAN), the Internet, a wireless, cellular, or wired network, and the like, and any combination thereof.

In an embodiment, the digital assistant 120 may be connected to, or implemented by, the I/O device 170. The I/O device 170 may be, for example and without limitation, a robot, a social robot, a service robot, a smart TV, a smartphone, a wearable device, a vehicle, a computer, a smart appliance, and the like.

The digital assistant 120 may be realized in software or firmware executing on hardware, hardware, and any combination thereof. An illustrative block diagram of a controller that may execute the processes of the digital assistant 120 is provided in FIG. 2. The digital assistant 120 is configured to process sensor data collected by sensors of, or coupled to, the I/O device 170. Such sensor data may be collected by one or more sensors, 140-1 to 140-N, where N is an integer equal to or greater than 1, hereinafter referred to as "sensor" 140 or "sensors" 140 for simplicity.

The I/O device 170 typically also contains or is coupled to one or more resources 150-1 to 150-M, where M is an integer equal to or greater than 1, hereinafter referred to as "resource" 150 or "resources" 150 for simplicity. The resources 150 may include, for example, electro-mechanical elements, display units, speakers, and the like. The electro-mechanical elements may include, for example, a robotic arm, robotic legs, and computer-controllable wheels. The resources 150 are typically used to take action by the I/O device 170 and may be used to execute a plan implementing an action in accordance with an engagement method. In addition, sensor data may also be made available from one or more resources 150. To this end, in an embodiment, at least one resource 150 may include at least one sensor as well, which may be one of the sensors 140. The sensors 140 and the resources 150 are included in the I/O device 170.

The sensors 140 may include input devices, such as various sensors, detectors, microphones, touch sensors, movement detectors, cameras, and the like. In various embodiments, any of the sensors 140 may be communicatively, or otherwise connected to the digital assistant 120, the particulars of such connection not illustrated in FIG. 1 for the sake of simplicity. The sensors 140 may be configured to sense signals received from a user interacting with the I/O device 170 or the digital assistant 120, signals received from the environment surrounding the user, and the like. In an embodiment, the sensors 140 may be implemented as virtual sensors that receive inputs from online services. In some such embodiments, the sensor data may not be strictly currently sensible information but may also include information that extends into or is predicted for the future, e.g., the weather forecast, a user's calendar, and the like. Similarly, resources 150 may receive and supply sensor data or other data, including from remote sources.

In an embodiment, the network diagram 100 further includes a database (DB) 160. The database 160 may be stored within the I/O device 170, e.g., within a storage device (not shown), or may be separate from the I/O device 170 and connected thereto via the network 110. The database 160 may be utilized for storing, for example, historical data about one or more users, users' preferences and related policies, and the like, as well as any combination thereof.

According to some examples, the digital assistant 120 is configured to select an engagement method that is used for executing a customized plan for a user of the digital assistant 120 when it is desirable to execute or take an action by the digital assistant 120. To this end, the current state of the user is determined, e.g., via sensor or resource data, and past behavior or routines of the user are learned using historic data. Based on the current state, the selected action, and the past behavior, an engagement method is selected and used by the digital assistant 120 for generating a customized plan for implementing the action. Should the digital assistant need to implement several actions, e.g., sequentially, the plan may implement a sequence of actions.

Figure 2:
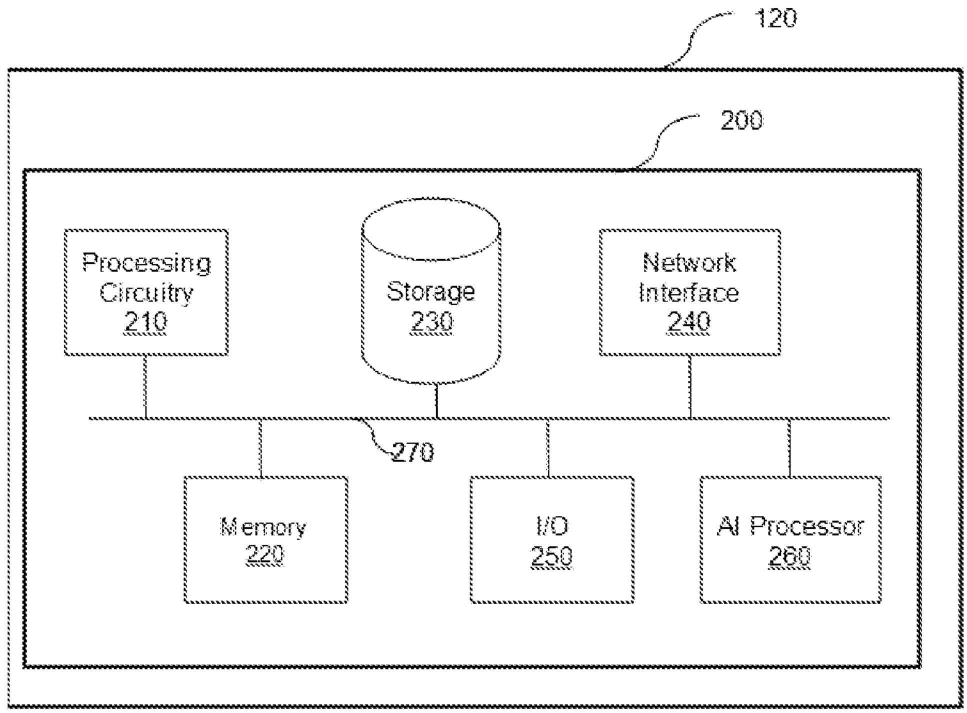
FIG. 2 is a diagram of a controller acting as a hardware layer of a digital assistant according to an embodiment.

FIG. 2 is an example block diagram of a controller 200 acting as a hardware layer of a digital assistant 120, according to an embodiment. The controller 200 includes a processing circuitry 210, a memory 220, a storage 230, a network interface 240, and an input/output (I/O) interface 250. According to a further embodiment, the components of the controller 200 are connected via a bus 270.

The processing circuitry 210 is configured to receive data, analyze data, generate outputs, and the like, as further described hereinbelow. The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may contain therein instructions that, when executed by the processing circuitry 210, can cause the controller 200 to execute actions as further described hereinbelow. The memory 220 may further store therein information, e.g., data associated with one or more users, historical data about one or more users, users' preferences, and the like.

The storage 230 may be magnetic storage, optical storage, and the like, and may be realized, for example, as a flash memory or other memory technology, or any other medium which can be used to store the desired information.

The network interface 240 is configured to connect to a network, e.g., the network 110 of FIG. 1. The network interface 240 may include, but is not limited to, a wired interface, e.g., an Ethernet port or a wireless port, e.g., an 802.11 compliant Wi-Fi card, configured to connect to a network (not shown).

The I/O interface 250 is configured to control the resources 150 (shown in FIG. 1) which are connected to the digital assistant 120. In an embodiment, the I/O interface 250 is configured to receive one or more signals captured by the sensors 140 (see FIG. 1) of the digital assistant 120 and to send such signals to the processing circuitry 210 for analysis. According to an embodiment, the I/O interface 250 is configured to analyze the signals captured by the sensors 140, detectors, and the like. According to an embodiment, processing circuitry 210 is configured to analyze the signals captured by the sensors 140, detectors, and the like. According to a further embodiment, the I/O interface 250 is configured to send one or more commands to one or more of the resources 150 for executing one or more plans, e.g., which include one or more actions, of the digital assistant 120, as further discussed hereinbelow. In a further embodiment, a plan may include one or more actions to be performed by the I/O device 170, for example, suggesting that the user will start her/his Yoga practice, reminding the user to take her/his medication in real-time, suggest playing jazz music, and the like.

In some configurations, the controller 200 may further include an artificial intelligence (AI) processor 260. The AI processor 260 may be realized as one or more hardware logic components and circuits, including graphics processing units (GPUs), tensor processing units (TPUs), neural processing units, vision processing units (VPU), reconfigurable field-programmable gate arrays (FPGA), and the like. The AI processor 260 is configured to perform, for example, machine learning based on sensory inputs received from the I/O interface 250, where the I/O interface 250 receives input data, such as sensory inputs, from the sensors 140.

According to the disclosed embodiments, the controller 200 is configured to collect a dataset about at least the user of the digital assistant 120. The dataset may include real-time data, as well as historical data about the user and the user's environment. The real-time data may be sensed and collected using one or more sensors, e.g., the sensors 140 shown in FIG. 1, and may indicate, for example, the user's mood, the specific location of the user, whether the user is awake or asleep, and the like. In a further embodiment, the controller 200 may be configured to collect real-time data about the user's environment, such as the current number of people near the user, the time, the current weather, and so on. The historical data may indicate for example, as whether the user takes a certain medication on a daily basis.

In an embodiment, the digital assistant 120 may be configured to determine a current state of the user and the environment near the user. To this end, the controller 200 is configured to collect and analyze at least a dataset that is associated with a user of the digital assistant 120. The dataset may be collected from a plurality of sensors, e.g., the sensors 140. The dataset may include, for example, images, video, audio signals, and the like, that are captured in real-time or near real-time with respect to the user. In an embodiment, the dataset may further include historical data about the user, information regarding user's behavioral patterns, user's routines, user's preferences, and so on. The dataset may include data that is related to the user's environment, such as the temperature outside the user's house or vehicle, traffic conditions, and the like. It should be noted that the dataset may be collected constantly or periodically.

A current state is state of a user and the state of the environment near the user in real-time, or near real-time. The current state may indicate whether, for example, the user is sleeping, reading, stressed, angry, or other actions or emotional behaviors. The current state may further indicate the current time, weather, number of people in the room, people's identity, and so on.

In an embodiment, the digital assistant 120 is configured to analyze the dataset. The analysis may be achieved by applying to the dataset, at least one algorithm, such as a machine learning algorithm, i.e., executing the at least one algorithm using the dataset as input thereto. The dataset may be fed into the algorithm, e.g., a machine learning model, thereby allowing the algorithm to determine in real-time or near real-time a current state of the user, and optionally, near the user interacting with the I/O device 170.

As an example, the current state may indicate that the user is sitting in the living room, that four people are sitting next to the user, the identity of those four people, and that the time is 5:40 pm.

In an embodiment, based on the determined current state, the digital assistant 120 selects an action to be executed by means of the I/O device 170. An action may be for example, suggesting that the user be more active, reminding the user to timely take medications, notifying the user that a message has been received in one of her/his social media accounts, gesturing to the user, e.g., to approach the I/O device 170, and so on. That is, the action may include providing to the user content that is generated by the digital assistant.

In an embodiment, the digital assistant 120 selects an engagement method from a plurality of engagement methods based on the determined current state and the selected action. An engagement method is a method for communicating with the user of the digital assistant having a predefined interruption intensity with respect to the user. It should be noted that the selected engagement method is used for increasing the probability that the user will cooperate with the selected action presented by the digital assistant, by reducing the probability that the user will be interrupted in an unpleasant manner when it is not necessary. That is, the engagement method reflects a required or a desirable level of interruption to the user, and as further discussed herein, it is determined based on the current state and based on the action the digital assistant selected for execution.

As a conceptual example, the collected dataset, which may include historical data and real-time data, may indicate that (a) the user has scheduled an appointment at her/his doctor's clinic and that the appointment is scheduled for 5 pm, (b) the time is now 4:25 pm, (c) the user is asleep, (d) the user ignored an alarm provided to the user 5 minutes ago to wake up, and (e) the doctor's clinic is located a 10-minute drive from the user's house. In accordance with this example, the digital assistant 120 may select a specific action which is providing an alert, the purpose of the alert being to cause the user to get out of bed and go to meet the doctor on time. having a high probability. Furthermore, according to this example, the action may be implemented using an engagement method that could be considered to be somewhat aggressive, e.g., intrusive proactive, because the goal of getting the user to the doctor on time is considered to be highly important. Thus, the alert may be implemented in accordance with the intrusive proactive engagement method by a plan that involves one or more of playing a relatively loud sound when reminding the user of the scheduled appointment, reminding the user the reason for the scheduled appointment, displaying a video on the display unit, emitting or causing display of lights in the dark room in order to attract the user's attention, play music, and so on.

In a different scenario, such as when an email is received at the user's electronic mailbox, the selected action by the digital assistant 120 is also to provide the user with an alert, the purpose of which is notify the user about the message and the intended goal being to have the user read the email message at some point. Since this goal is of relatively low importance, according to this example, the action, i.e., alert, may be implemented using an engagement method that could be considered to be relatively mild, e.g., subtle proactive engagement. As such, the plan may include only a muted animation that is displayed on a display unit of the I/O device 170.

The plurality of engagement methods may include, for example, the following engagement methods: Intrusive Proactive, Direct Proactive Gateway, Indirect Proactive Gateway, Categorical Proactive Gateway, Subtle Proactive, Silent Proactive, Contextual Proactive Gateway, and the like.

Intrusive Proactive engagement method may include, for example, asking the user by means of the I/O device 170, to measure her/his blood pressure. According to the same example, such action, i.e., asking the user to measure her/his blood pressure, may be executed even when the user has company, or the user is in the middle of a long phone call. That is, the intrusive proactive is one of the engagement methods that may be used when the topic to which the action is required is very important to the user, such as, the user's health, safety, and the like.

Direct Proactive Gateway engagement method may include, for example, trying to draw the user's attention before making a suggestion, a reminder, a request, and the like. According to the same example, the digital assistant may ask the user an initial question such as: "Hey, do you have a minute?" and then ask the main question, execute a reminder, and so on. That is, the Direct Proactive engagement method is less intrusive than the Intrusive Proactive engagement method.

Indirect Proactive Gateway engagement method may include, for example, asking the user, by means of the I/O device 170, a question regarding a secondary topic that is related to a main topic. After collecting and analyzing the user's response with respect to the secondary topic, the controller 200 determines the user's availability and executes an action that is related to the main topic. For example, the secondary topic may be related to a sport event the user has watched earlier today and the main topic may include a suggestion to do yoga.

Categorical Proactive Gateway engagement method may include, for example, asking the user, by means of the I/O device 170, if the user is available with respect to a specific topic. That is, the user may not want to talk with the digital assistant 120 about her/his health issues at the moment. However, the user may be glad to talk about a movie she/he has watched.

Contextual Proactive Gateway method may include using data that was gathered earlier about the user for creating an appropriate engagement with the user. For example, the user may ask not to be bothered as she/he is reading a book. According to the same example, when the digital assistant 120 identifies that the user closed the book and stood up, the digital assistant 120 may proactively suggest going out for a walk.

Subtle Proactive engagement method may include, for example, emitting a soft sound (i.e., not using words only soft sounds), emitting light, displaying content on a display unit, etc. in order to draw the user's attention. That is, the Subtle Proactive may be used when the topic to which the action is required is not that important.

Silent Proactive engagement method may include, for example, displaying content on the display unit without making any sound in order to draw the user's attention without making any sound.

It should be noted that the engagement methods and type of actions described above are only examples, and other types of engagement methods can be defined, generated, and presented to the user.

As noted above the engagement method is selected from a plurality of engagement methods based on the determined current state and the selected action. It should be noted that, the current state may be indicative of the availability level of the user. For example, when the user has company at home, the availability level may be relatively low; when the user is alone watching TV, the availability level may be relatively high; when the user indicates that she/he is not available and does not want to be interrupted the availability level may be relatively low, and the like. The selected action to be executed by the digital assistant may be associated with different importance levels. For example, a selected action of reminding the user to take medications may be associated with a relatively high importance level; a selected action of suggesting the user to read new emails may be associated with a relatively low importance level.

In an embodiment, a set of rules may be applied to the determined current state, e.g., to values associated with the current state, and the selected action for determining or selecting the most suitable engagement method. In a further embodiment, the determined current state, e.g., values associated with the current state, and the selected action may be fed as an input into a trained machine learning model that is adapted to select an optimal engagement method.

In an embodiment, the controller 200 may be configured to generate a customized plan for proactively executing the selected action based on at least the selected engagement method. In an embodiment, the customized plan is generated based on the selected action, the engagement method by which the action will be presented to the user, a preferred approach, e.g., cynical, likeable, preferred tone, and the like. For example, the controller 200 generates a customized plan for executing a reminder for the user to take his medications on time. According to the same example, the historical data about the user indicates that the user takes a certain medication every day at 4 pm, and after collecting and analyzing real-time data the current state indicates that the time is 4:10 and that the user did not take the medication and he is currently listening to music. According to the same example, since taking the medication on time is important to the user's health, and the user is busy listening to music, the generated plan may include an engagement method having a relatively high intrusive level. Such relatively high intrusive level may be associated with the Intrusive Proactive engagement method by which, for example, the music to which the user is listening will be muted by the digital assistant 120 and a reminder will be executed.

In a further embodiment, a trained machine learning model may be used for generating the customized plan that is used for proactively executing the selected action. According to the same embodiment, the selected engagement method may be fed into the trained machine learning model thereby allowing the model to couple the selected engagement method with an optimal customized plan for the user. In a further embodiment, the customized plan is executed by means of the I/O device 170.

Figure 3:
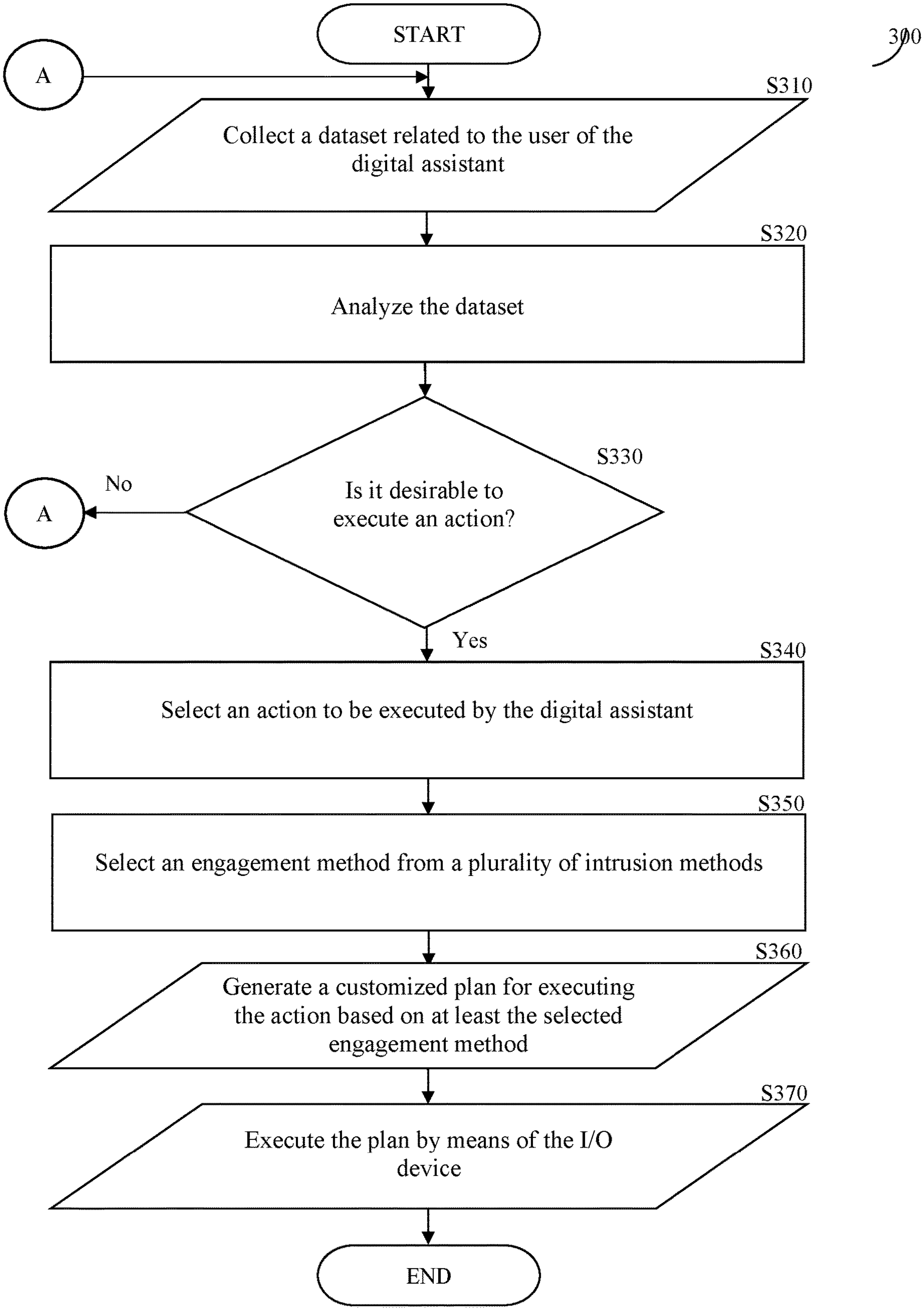
FIG. 3 is a flowchart of a method for selecting an engagement method for generating and executing a customized plan for a user of a digital assistant according to an embodiment.

FIG. 3 shows an example flowchart 300 of a method for managing engagement methods of a digital assistant while communicating with a user of the digital assistant according to an embodiment. The method described herein may be executed by the controller 200 that is further described herein above with respect to FIG. 2. The controller 200 is integrated in an I/O device operating the digital assistant 120.

At S310, a dataset about a user of the I/O device 170 is collected. The dataset may be collected using one or more sensors, e.g., the sensors 140, which, as indicated above, may, e.g., a virtual sensor, also be able to obtain data from other data sources such as the Internet, from the user's calendar, and the like. The data that may be included in the dataset may include not only conventional sensor data but may also include data of various types such as images, video, audio signals, and the like. Further, such data may be collected in real-time or near-real-time with respect to the user. In addition, the dataset may include, without limitation, data related to the environment near the user such as, for example and without limitation, temperature, traffic conditions, and the like. In an embodiment, the dataset may further include historical data pertaining to the user, data from one or more web sources, and the like.

At S320, the collected dataset is analyzed to determine the current state of a user. The analysis may be performed by supplying the dataset to, and executing, at least one algorithm, such as a machine learning algorithm, which is adapted to determine at least a current state of a user from the dataset. In an embodiment, the collected dataset is input into a machine learning model that is trained to provide a current state of the user. Such model may be adapted to determine a current state with respect to the environment near the user, e.g., in a predetermined proximity to the user, based on at least a portion of the collected dataset.

The current state may reflect the state of the user and the state of the environment near the user in real-time, or near-real-time. The current state may indicate whether, for example, the user is sleeping, reading, stressed, angry, and so on. The current state may further indicate the current time, the weather, the number of people in the room, the identities of one or more people, or the like. In other configurations, the collected dataset may be analyzed using, for example and without limitations, one or more computer vision techniques, audio signal processing techniques, unsupervised machine learning techniques, and the like.

At S330, it is checked whether it is desirable to execute, by means of the I/O device 170, an action based on at least the current state and if so, execution continues with S340; otherwise, execution returns to S310.

At S340, an action, i.e., a specific action, to be executed by means of the I/O device 170 is selected based on the analyzed dataset and the determined current state. An action may be for example, suggesting the user to be more active, reminding the user to timely take medications, notifying the user that a message has been received in one of her/his social media accounts, and so on.

At S350, an engagement method is selected from a plurality of engagement methods based on the determined current state and the selected action. An engagement method is a method for communicating with the user of the digital assistant having a predefined interruption intensity with respect to the user. That is, the engagement method reflects the required level of interruption to the user based on the type of the action to be taken and the current state. As noted above, the plurality of engagement methods may include, for example and without limitations, the following engagement methods Intrusive Proactive, Direct Proactive Gateway, Indirect Proactive Gateway, Categorical Proactive Gateway, Subtle Proactive, Silent Proactive, and the like.

At S360, a customized plan is generated for executing the selected action based on at least the selected engagement method. The customized plan includes at least the required action and the selected engagement method that defines the way as well as the means, e.g., resources 150, by which the action will be executed. At S370, the customized plan is executed by means of the I/O device 170.

The various disclosed embodiments may be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit.

All examples and conditional language recited herein are intended for pedagogical purposes to aid the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the disclosure may be achieved without departing from the scope of the disclosed disclosure. All such embodiments are included herein. The scope of the disclosure should be limited solely by the claims thereto.

What is claimed is:

1. A method for interacting by a digital assistant with a user of the digital assistant, comprising:
   - determining by the digital assistant an action to be executed by the digital assistant, wherein the action is determined based on at least a sensed current state of the user and a sensed current state of an environment near the user;
   - selecting an engagement method from a plurality of engagement methods based on the current state of the user, the current state of an environment near the user, and the selected action, wherein each engagement method is a method for communicating with the user of the digital assistant that has a predefined interruption intensity with respect to the user;
   - generating a customized plan for executing the determined action based on at least the selected engagement method; and
   - executing the generated plan by employing an input/output (I/O) device on which the digital assistant is executing.

2. The method of claim 1, wherein determining the action further comprises:
   - collecting a dataset related to the user, the dataset including a least one piece of data sensed by at least one sensor coupled to the digital assistant; and
   - applying a machine learning model trained to determine a current state based on the collected dataset, wherein the current state is the state of the user and the state of the environment near the user in real-time or near real-time.

3. The method of claim 2, wherein collected dataset includes: real-time data related to a user obtained via the at least one sensor and historical data related to past activity of the user.

4. The method of claim 3, wherein at least one piece of historical data related to the user is obtained from at least one source external to the digital assistant.

5. The method of claim 1, wherein the selected engagement method is one of: intrusive proactive, direct proactive gateway, indirect proactive gateway, categorical proactive gateway, contextual proactive gateway, subtle proactive, and silent proactive.

6. A system for interacting by a digital assistant with a user of the digital assistant the system, comprising:
   - a processing circuitry; and
   - a memory, the memory containing instructions that, when executed by the processing circuitry, configure the system to:
   - determine an action to be executed by the digital assistant, wherein the action is determined based on at least a sensed current state of the user and a sensed current state of an environment near the user;
   - select an engagement method from a plurality of engagement methods based on the current state of the user, the current state of an environment near the user, and the selected action, wherein each engagement method is a method for communicating with the user of the digital assistant that has a predefined interruption intensity with respect to the user;
   - generate a customized plan for executing the determined action based on at least the selected engagement method; and
   - execute the generated plan by employing an input/output (I/O) device on which the digital assistant is executing.

7. The system of claim 6, wherein to determine the action further comprises:
   - collect a dataset related to the user, wherein the dataset includes a least one piece of data sensed by at least one sensor coupled to the digital assistant; and
   - apply a machine learning model trained to determine a current state based on the collected dataset, wherein the current state is the state of the user and the state of the environment near the user in real-time or near real-time.

8. The system of claim 7, wherein collected dataset includes: real-time data related to a user obtained via the at least one sensor and historical data related to past activity of the user.

9. The system of claim 8, wherein at least one piece of historical data related to the user is obtained from at least one source external to the digital assistant.

10. The system of claim 6, wherein the selected engagement method is one of: intrusive proactive, direct proactive gateway, indirect proactive gateway, categorical proactive gateway, contextual proactive gateway, subtle proactive, and silent proactive.

11. A method performed by an input/output (I/O) device having a digital assistant, at least one sensor, and at least one resource, the method comprising:
   - determining by the digital assistant an action to be executed by the I/O device, wherein the action is determined based on at least a sensed current state of a user of the I/O device and a current state of an environment near the user, wherein the at least one sensor is used to sense information upon which is based at least one of the current state of the user and the current state of the environment near the user;
   - selecting an engagement method from a plurality of engagement methods based on the current state of the user, the current state of an environment near the user, and the determined action, wherein each engagement method is a method for communicating with the user of the digital assistant that has a predefined interruption intensity with respect to the user;
   - generating a customized plan for executing the determined action based on at least the selected engagement method; and
   - executing the generated plan by at least operation of at least one of the at least one resource.

12. The method of claim 11, wherein determining the action further comprises:
   - collecting a dataset related to the user, the dataset including a least one piece of data sensed by at least one sensor coupled to the digital assistant; and
   - applying a machine learning model trained to determine a current state based on the collected dataset, wherein the current state is the state of the user and the state of the environment near the user in real-time or near real-time.

13. The method of claim 12, wherein collected dataset includes: real-time data related to a user obtained via the at least one sensor and historical data related to past activity of the user.

14. The method of claim 13, wherein at least one piece of historical data related to the user is obtained from at least one source external to the digital assistant.

15. The method of claim 11, wherein the selected engagement method is one of: intrusive proactive, direct proactive gateway, indirect proactive gateway, categorical proactive gateway, contextual proactive gateway, subtle proactive, and silent proactive.

16. The method of claim 11, wherein the at least one sensor is a virtual sensor.

17. The method of claim 11, wherein the at least one sensor is part of the at least one resource.

* * * * *